(12) United States Patent
Stebbing

(10) Patent No.: US 8,114,185 B2
(45) Date of Patent: *Feb. 14, 2012

(54) METHOD OF MELTING A MIXTURE OF SCRAP METAL USING SCRAP RUBBER

(76) Inventor: Franklin Leroy Stebbing, Norfolk, NE (US)

(*) Notice: Subject to any disclaimer, the term of this patent is extended or adjusted under 35 U.S.C. 154(b) by 0 days.

This patent is subject to a terminal disclaimer.

(21) Appl. No.: 12/719,604

(22) Filed: Mar. 8, 2010

(65) Prior Publication Data

US 2010/0154594 A1 Jun. 24, 2010

Related U.S. Application Data

(63) Continuation of application No. 12/203,742, filed on Sep. 3, 2008, now Pat. No. 7,674,318, which is a continuation of application No. 09/974,199, filed on Oct. 10, 2001, now abandoned, which is a continuation-in-part of application No. 09/311,401, filed on May 13, 1999, now abandoned.

(51) Int. Cl.
*C21C 5/52* (2006.01)
(52) U.S. Cl. .......................................... 75/10.63; 266/45
(58) Field of Classification Search .................... 266/45; 75/10.63

See application file for complete search history.

(56) References Cited

U.S. PATENT DOCUMENTS

| 3,946,680 | A | 3/1976 | Laman |
| 5,244,490 | A | 9/1993 | Agarwal |
| 5,322,544 | A | 6/1994 | Stebbing |
| 6,287,379 | B1* | 9/2001 | Khalifeh ..................... 106/745 |
| 7,674,318 | B2* | 3/2010 | Stebbing ..................... 75/581 |

* cited by examiner

*Primary Examiner* — Scott Kastler
(74) *Attorney, Agent, or Firm* — Banner & Witcoff, Ltd.

(57) ABSTRACT

A process for melting scrap metal for producing steel which includes the steps of combining a quantity of scrap metal and scrap rubber in an electric arc furnace. Energy is then applied to the quantity of steel and scrap rubber in the furnace to start the combustion of the scrap rubber to add additional heat for melting the scrap metal containing steel.

10 Claims, 3 Drawing Sheets

METHOD OF MELTING A MIXTURE OF SCRAP METAL USING SCRAP RUBBER

CROSS-REFERENCE TO RELATED APPLICATION

This application is a continuation of Ser. No. 12/203,742 filed Sep. 3, 2008, now U.S. Pat. No. 7,674,318, which is a continuation of Ser. No. 09/974,199 filed Oct. 10, 2001, now abandoned, which is a continuation-in-part application of Ser. No. 09/311,401 filed May 13, 1999, now abandoned.

BACKGROUND OF THE INVENTION

1. Technical Field

This invention relates generally to the manufacturing of steel in a furnace and more particularly to the manufacturing of steel from scrap metal in an electric arc furnace using scrap automotive tires as an auxiliary heat supplying source.

2. Description of the Prior Art

Scrap automotive tires present an environmental problem and recycling is practically nonexistent. Tires do not degrade in landfills and when stockpiled, create a major fire hazard that is impossible to extinguish once ignited. Since they have about the same heating value as coke, 15,000 BTU's per pound, a tire weighing about 20 pounds has approximately 300,000 BTU's. The scrap automotive tires are so plentiful that they have a near zero cost. At the present time, scrap automotive tires are being used as fuel or auxiliary fuel in a variety of operations such as cement kilns, coal fired generators and other applications wherein a controlled firing rate is used. In such instances, it is often necessary to shred the scrap automotive tires prior to using in a furnace. Also, when the scrap automotive tires contain steel belts, it is often necessary to remove the steel belts. In some instances whole rubber tires have been used but such use required equipment changes that reduced the cost advantages. In the manufacturing of steel from scrap metal, some of the steel mills add coke or coal to the scrap metal that is melted in a furnace such as an electric arc furnace.

An Electric Arc Furnace (EAF) is not an ordinary furnace in any sense of the word. It is a vessel for melting steel and providing metallurgical processing. It is believed that the EAF is the best choice for use of the tires, or as it is often referred to, tire derived fuel ("TDF"), as it can overcome all of the specific problems associated with the steel belts and beads when using TDF.

Tires are sometimes used as a fuel or supplemental fuel in the generation of electric power. Because of the problems created by the steel in the TDF they are not widely used or accepted as a fuel by electric utilities. Whether or not tires are used, the electric power has to be converted to higher voltages, transmitted to the steel mill and then converted back into heat by the electric arc. By using tires directly as energy in the steel furnace all of the losses in transmission and conversion are eliminated.

Because of the problems created by the steel belts and beads, the amount of tires now being used is not large enough to consume the amount of tires generated each year as scrap. TDF is the largest use for scrap tire disposal but the amount of tires scraped each year far exceeds the number that can be consumed by all of the various outlets combined. A large portion are shredded and buried in landfills. Only the steel industry, as a very large consumer of energy, has the capability to consume tires in an amount approaching that of the rate of disposal. Therefore, it should be noted that not only does the burning of tires for fuel increase the efficiency of the EAF, it also provides a unique solution for disposing of tires in an environmentally sound method. It provides an alternative to wasting and squandering valuable energy at a time when energy is becoming more scarce and costly. Furthermore, even when the steel industry decides to reuse the steel belts from the tires, the tires are stripped or shredded to remove the rubber to access the steel belts. Much of the rubber is then discarded, which provides only a limited solution to the problem of the waste rubber. There is therefore a need for a process which will utilize both the steel and the rubber found in most tires, and which does so in an efficient and productive manner.

In the EAF, coal or coke is added to the scrap charge as a source of chemical energy but also as an additional source of carbon for the steel being manufactured. The addition of rubber reduces or eliminates the need for coal or coke as a carbon source for steel chemistry requirements.

Therefore, an object of the present invention is to provide an improved method of melting scrap metal using scrap rubber.

Another object of the present invention is to provide an improved method of melting scrap metal using scrap rubber which includes the steps of combining a quantity comprising scrap metal containing steel and at least about 0.25 percent by weight of scrap rubber, forming a bundle of the combined scrap metal and scrap rubber, placing the bundle in an electric arc furnace and applying energy to the quantity in the furnace to start the combustion of the scrap rubber to add additional heat for melting the scrap metal containing steel.

Another object of the present invention is to provide an improved method of melting scrap metal using scrap rubber which will use various types of scrap rubber, including chopped, shredded and even whole tires baled and unbaled, both with the steel belt included and without.

Another object of the present invention is to provide an improved method of melting scrap metal using scrap rubber in which the pollution emitted from the steel plant is greatly reduced, because, specifically, when scrap rubber tires are added to the melting steel, the carbon monoxide emissions that normally occur from the arc furnace are greatly reduced.

Another object of the present invention is to provide an improved method of melting scrap metal using scrap rubber which includes a separate burning container for the tires which is in fluid transmission connection with the furnace such that the heat produced by the burning tires in the container is transferable to the furnace without adding impurities caused by the introduction of steel belts from the tires.

Finally, an object of the present invention is to provide an improved method of melting scrap metal using scrap rubber which is safe, efficient and environmentally sound in use.

SUMMARY OF THE INVENTION

This invention relates to a method for melting steel using scrap metal and at least about 0.25 percent by weight of scrap rubber, such as scrap automotive tires, wherein scrap metal and scrap rubber tires are deposited in a steel melting furnace, such as an electric arc furnace, and the scrap rubber tires or pieces thereof are combusted with air or oxygen to provide an auxiliary source of heat to melt the scrap metal.

In the preferred embodiment of the invention, an electric arc furnace is used. In the preferred method, a quantity of scrap metal with or without rubber is deposited in the electric arc furnace and heat is applied thereto to form a molten pool of metal. The scrap metal is the conventional scrap metal used to make steel. A quantity of scrap rubber, preferably scrap rubber tires, in an amount of at least 0.25 percent by weight, is then loaded into a bottom opening bucket and another quantity of scrap metal is loaded into the bucket on top of the scrap rubber tires. The bottom of the bucket is then opened and the scrap rubber tires fall into the electric arc furnace followed by the scrap metal. If desired, some of the scrap rubber tires could be included in the first quantity of scrap metal melted in the furnace. In addition to the electrodes, the furnace may have oxygen/air blow pipes or oxygen/natural gas burners to assist in the melting of the scrap metal and in the combustion of the scrap rubber tires. The scrap rubber tires ignite and are combusted to add auxiliary heat to the furnace. Once the scrap rubber tires are ignited, the natural gas is turned off and the oxygen is available for the combustion of the scrap rubber tires. The electrodes in the electric arc furnace continue to operate and function to control the temperature in the furnace. Additional charges of scrap metal or scrap metal and scrap rubber are subsequently added into the furnace until its capacity has been reached. Of course, the temperature in the furnace would preferably be the temperature normally used in the making of steel from scrap metal which is about 2950 degrees Fahrenheit.

In another preferred embodiment of the invention, a container for the pyrolysis of the scrap whole, or cut, or shredded and de-wired rubber tires is located adjacent to an electric arc furnace. Hot exhaust gases from the electric arc furnace are fed into a jacket surrounding the container to heat the whole, cut or shredded and de-wired rubber tires and convert them to combustible liquids and gases. Suitable control means are provided to feed the resulting combustibles into the electric arc furnace to function as an auxiliary source of heat during the combustion thereof.

In still another embodiment of the present invention, the scrap metal and scrap rubber are combined to form a scrap metal and rubber bundle, with the scrap rubber intermixed with the scrap metal. The metal acts as a flame retardant and also as a heat sink, thereby preventing rapid and uncontrolled burning of the scrap rubber. Further, the bundles may be picked up by a scrap magnet much as is done with the standard scrap metal bundles found in the industry today. The scrap metal/scrap rubber bundle thus provides a controlled rate of burning while also permitting relatively easy handling of the scrap rubber and scrap metal.

In yet another embodiment, the shredded rubber is added and intermixed with the shredded steel scrap to form a generally homogenous mixture. This mixture can then be readily handled by a magnet for easy insertion of the mixture into the EAF. It is thus seen that the present invention provides a substantial improvement over the prior art.

DESCRIPTION OF THE PREFERRED EMBODIMENT

Figure 1:
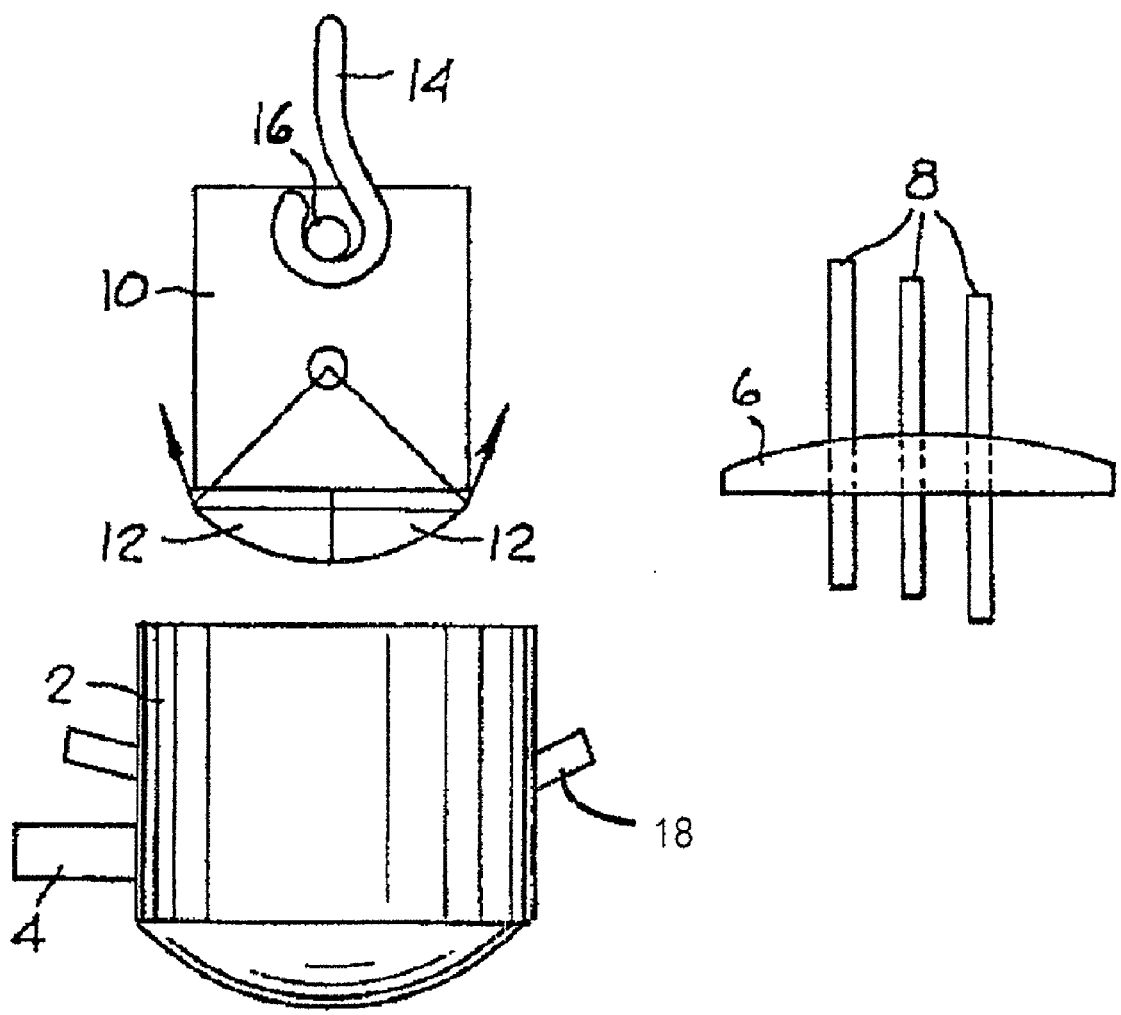
FIG. 1 is a schematic illustration of apparatus for use in one preferred embodiment of the invention.

The present invention is shown best in FIG. 1, which illustrates an electric arc furnace 2 of the type generally used in a manufacturing operation to convert scrap metal into steel and is provided with a pouring spout 4, bottom tap (not shown) or the like. The roof 6 with the electrodes 8 has been raised and swung aside. A charging bucket 10 having bottom doors 12 has been positioned over the electric arc furnace 2 and is supported by a pair of hooks 14 (only one shown) engaging outward projecting integral studs 16 (only one shown). The hooks 14 are part of a conventional crane (not shown) which moves the charging bucket 10 to the position over the electric arc furnace. Oxygen/natural gas burners 18 extend through the sidewall or roof of the electric arc furnace and are used to assist in the melting of the scrap metal and the ignition of scrap rubber tires as described below. Once the scrap rubber tires have been ignited, the natural gas is turned off and the oxygen is available for the combustion of the scrap rubber tires.

It is to be understood that although the present invention is described as using a charging bucket to add the scrap metal and rubber, more modern plants may add the scrap metal to the arc furnace via conveyors or shafts which permit the furnace to remain closed during the adding of scrap metal. The scrap rubber would be added to the conveyor or shaft in the desired amounts and at the proper time and location to enable the method of the present invention to be employed.

In a preferred process of this invention, a first quantity of scrap metal (not shown) of the type conventionally used in the manufacture of steel from scrap metal has been loaded into the charging bucket 10 and moved to the position illustrated in FIG. 1. A quantity of scrap rubber tires is also placed in the charging bucket 10 and the scrap metal and rubber is then dropped into the electric arc furnace 2. The charging bucket 10 is then removed and the roof 6 with the electrodes 8 mounted thereon is moved to an operating position in the electric arc furnace 2. An electric current is supplied to the electrodes 8 and the oxygen/natural gas burners 18 are ignited to generate heat to melt the scrap metal. In one example of the process using an electric arc furnace having a capacity of 100,000 pounds, the first quantity of scrap metal comprised 30,000 pounds and the first quantity of scrap rubber comprised approximately 1,000 pounds.

During the melting of the first quantity of scrap metal, the charging bucket 10 is loaded with a second quantity of materials. The second quantity of materials comprises a quantity of scrap rubber tires which are first loaded into the charging bucket and a second quantity of scrap metal that is loaded into the charging bucket on top of the scrap rubber tires. It is important to note that various forms of scrap rubber tires can be used with the method of the present invention, including chopped, shredded, whole tires and even tire bales, both with the scrap steel included and without. It has been found that depending upon the desired rate of burn (infusion of energy from the burning tires), the size and amount of the scrap tire pieces can be modified and changed, with the quickest heat addition coming when shredded tires are used and the longest lasting heat addition coming when whole tires are used. The heat influx provided by the tires can be calculated such that a practitioner of the present invention would be able to generally control the amount and timing of heat influx, which is critical in the operation of the EAF and in the creation of certain alloys and other metal combinations.

After the charging bucket is filled with the scrap rubber tires and the scrap metal, the roof 6 with the electrodes 8 is raised and swung aside. The charging bucket 10 is moved to a position over the electric arc furnace 2 and the bottom doors 12 are opened to drop the scrap rubber tires followed by the additional scrap metal into the electric arc furnace 2. The charging bucket is moved out of the way and the roof 6 with the electrodes 8 is moved back onto the electric arc furnace 2. The heat of the molten scrap metal in the electric arc furnace 2 and the heat generated by the electrodes 8 together with the oxygen/natural gas burners 18 in the furnace function to ignite the scrap rubber tires and their combustion with air or oxygen functions to produce auxiliary heat to heat the additional scrap metal as the heat moves through the additional scrap metal. The electrodes 8 continue to operate to control the temperature of the molten material and to assist in the melting of the additional scrap metal but the power supplied to the electrodes 8 is reduced as a result of the heat generated by the combustion of the scrap rubber tires. As stated above, once the scrap rubber tires have been ignited, the natural gas is turned off and the oxygen is available for the combustion of the scrap rubber tires. If the electric arc furnace 2 is not equipped with oxygen/natural gas burners, a conventional lance or blow pipe may be used to provide the oxygen for the combustion of the scrap rubber tires, in addition to other methods such as the admission of air into the furnace through doors, dampers or other such openings. In accordance with the example described above, the second quantity of materials comprises about 600 pounds of scrap rubber tires and about 30,000 pounds of additional scrap metal. The temperature in the electric arc furnace is the conventional temperature used to melt scrap metal which is about 2950 degrees Fahrenheit. If desired, a quantity of the scrap rubber tires, such as about 100 to 1000 pounds, can be included with the first quantity of scrap metal.

During the melting of the second quantity of scrap metal, a second quantity of materials comprising a second quantity of scrap rubber tires and a third quantity of scrap metal is loaded into the charging bucket 10. When the second quantity of scrap metal has been melted, the roof 6 with the electrodes 8 and the charging bucket 10 are moved to drop the third quantity of scrap metal into the electric arc furnace 2, the charging bucket 10 is moved away and the roof 6 with the electrodes 8 are moved back into the operating position. In accordance with the example described above, the second quantity of scrap rubber tires is about 500 pounds and the third quantity of scrap metal is about 20,000 pounds.

The process is then repeated to add a third quantity of materials comprising a third quantity of scrap rubber tires and a fourth quantity of scrap metal necessary to reach the capacity of the electric arc furnace 2. If the scrap rubber tires have steel belts, then the steel in the steel belts becomes part of the molten steel in the electric arc furnace 2. The third quantity of scrap rubber tires is in an amount of about 500 pounds.

In the example described above, the second quantity of materials was added to the electric arc furnace 2 about 15 minutes after the current was supplied to the electrodes to commence the melting of the first quantity of scrap metal. The third and fourth quantities of materials are added in successive intervals spaced about 15 minutes apart. After about another 15 minutes, normal refining processes are performed on the molten metal to obtain desired characteristics. It is to be understood that the foregoing is only an example and that other quantities and ratios of scrap metal and scrap tires and other sizes of furnaces may be used.

Figure 3:
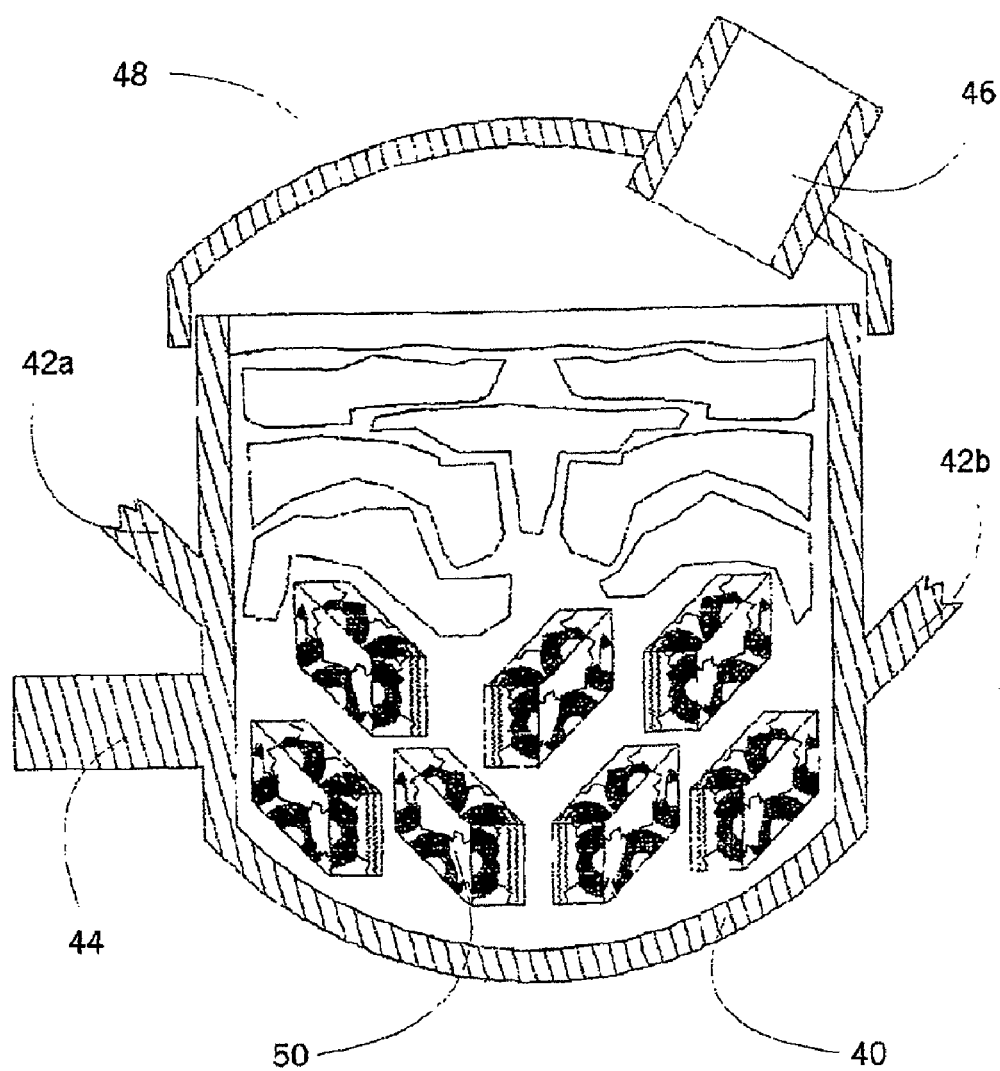
FIG. 3 is a schematic illustration of apparatus for use in yet another preferred embodiment of the invention.

While it may be preferable in general melting processes to use whole scrap rubber tires so as to control the combustion thereof, if shredded scrap rubber tire were to be used, the combustion would occur very rapidly and generate an amount of heat far greater than that produced by the combustion of the whole scrap rubber tires. A variation for additional control of combustion is shown in FIG. 3 in which scrap metal and scrap tire bundles 50 are dropped into a furnace 40 through an optimally located opening 46, the furnace 40 already containing a quantity of molten scrap metal and unmelted scrap 48. Two oxy/fuel burners 42a and 42b extend into the furnace 40 for igniting the tires and providing combustion oxygen. As the scrap tires burn, energy is added to the mass of scrap metal 48 and the scrap metal in the bundles and the remaining unmelted scrap metal is melted at a faster and more efficient rate than that ordinarily obtained. Molten slag floats to the top of the molten metal and the molten scrap metal is then poured out of the furnace 40 through pouring spout 44. This embodiment presents significant advantages over the prior art and even is superior to merely combining the scrap rubber in the metal. With the scrap metal and scrap rubber being combined to form a scrap metal and rubber bundle, i.e., the scrap rubber intermixed with the scrap metal, the metal acts as a flame-spread reducer and also as a heat sink, thereby preventing rapid and uncontrolled burning of the scrap rubber. Further, the bundles may be picked up by a scrap magnet much as is done with the standard scrap metal bundles found in the industry today. The scrap metal/scrap rubber bundle thus provides a controlled rate of burning while also permitting relatively easy handling of the scrap rubber and scrap metal.

An additional important feature of the present invention is that the pollution emitted from the steel plant is greatly reduced when scrap rubber tires are added to the melting steel. When tires are added to the scrap metal the carbon monoxide emissions that normally occur from the arc furnace are greatly reduced. The tires act as a catalyst for carbon monoxide to carbon dioxide conversion. This also results in a much greater release of usable energy inside the furnace converting the energy therein where it has the most benefit for the melting of the steel. When conventional coal or coke is used, a lot of the available chemical energy is lost because the carbon in the fuel does not completely convert to carbon dioxide during the burning process. Numerous studies have been done looking into ways to increase the conversion rate and thus increase the efficiency of the melting process, including such methods as additional oxygen injection and other such techniques. The scrap rubber tires used in the method of the present invention provide at least a partial solution to this problem even if used only as a supplement to the coal or coke just for this purpose. More than half of the available energy is lost if the carbon is not allowed to react all the way to $CO_2$. Often the carbon monoxide converts in the duct system outside of the furnace resulting in wasted energy, duct damage or even explosion, as it is a combustible gas. It has been found that the addition of the scrap tires as taught in the present invention will at least provide a partial solution to these problems. The inclusion of scrap tires in the melting process also has been shown to reduce NOx and $SO_2$ emissions when properly combusted in the EAF. This is another very important environmental consideration in steel mill operations and environmental operating permit compliance.

The use of TDF in the EAF also reduces the air pollution from the EAF process. TDF contains less carbon and therefore produces less carbon dioxide than coal or coke whether it is burned at the EAF or back at the electric utility. TDF contains twice as much hydrogen and burns hotter, i.e., it contains more fuel value. Additionally the hydrogen acts as a catalyst and reduces CO emissions, a very important and environmentally significant goal in the steel industry. The shredded tires can also be mixed with coal or coke and used to reduce CO emissions with a result being a greatly increased energy release from CO to $CO_2$ conversion.

Figure 2:
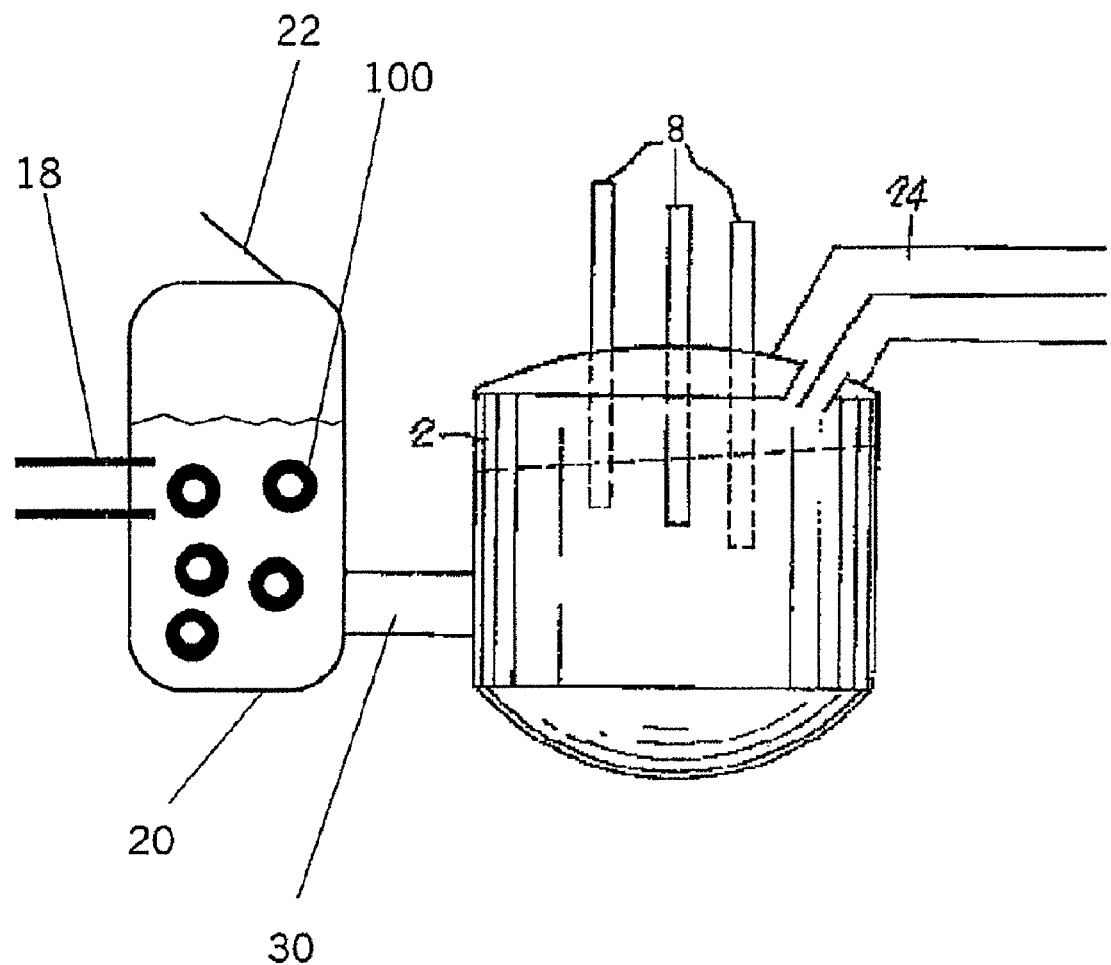
FIG. 2 is a schematic illustration of apparatus for use in another preferred embodiment of the invention.

An apparatus for practicing another preferred embodiment of the invention is schematically illustrated in FIG. 2. Apparatuses similar to that shown in FIG. 1 have been given the same reference numerals. In FIG. 2, a container 20 is mounted at a fixed location by conventional mounting means (not shown) so that it is close to the electric arc furnace 2 and has a removable control damper/cover 22 which is used to adjust the amount of combustible air available to the tires 100 which are to be burned within the container 20 thus regulating the rate of heat in the process. At least one oxy/gas burner 18 is connected to the container 20 to ignite the tires 100 within the container 20, the oxy/gas burner 18 operating in a manner similar to that described previously in connection with the first embodiment. A pipe 30 extends between and is in fluid communication with the container 20 and the electric arc furnace 2. A fume collecting system duct 24 is in fluid communication with the interior of the electric arc furnace 2 so that the heat generated by the burning of the tires 100 is drawn into the electric arc furnace 2, the heat passing through the fume collecting system duct 24. A molten metal conduit 4 is in fluid communication with the electric arc furnace 2 for releasing the molten metal from the electric arc furnace 2. As the fume collecting system duct 24 draws the superheated air from the container 20 into the electric arc furnace 2 around the metal being melted in the electric arc furnace 2, the heat generated by the burning tires adds to the heat generated by the oxy/gas burners in the electric arc furnace 2 thus decreasing the time and energy required to melt the steel and thus lowering the cost of steel production.

In practice, a quantity of whole, cut or shredded and de-wired rubber tires (not shown) is deposited into the container 20 and the oxy/gas burners 18 are used to ignite the whole, cut or shredded and de-wired rubber tires 100 to form combustible liquids and gases. The combustible liquids and gases flow through the pipe 30 thus adding their energy produced by combustion to the steel being melted in the electric arc furnace 2.

Still another embodiment of the present invention would include a somewhat modified container 20 as described in connection with FIG. 2. One of the problems with using tire derived fuel is the steel belts and beads that they contain. The steel generally does not belong in a combustion chamber as typically found in a coal or gas fired boiler or similar fuel burning system.

The tire-burning container 20 is a type of burner with tires as the fuel and with a supply of air or oxygen like most any conventional burner, similar to what was described previously. In this embodiment, however, the container 20 would include at the bottom of the container a cleanout opening for the metal residue. The tires in the container would be ignited so that they would decompose into combustible vapors and gasses. Just enough oxygen would be supplied to maintain this state, thus causing the tires to melt with the metal within the tires beginning to separate therefrom. The combustibles would then flow to an area where they would be mixed with additional oxygen and blown or drawn into the area where the heat was needed, such as a boiler or similar furnace firebox. The metal would separate and settle to the bottom of the container, as the melting point of the metal is higher than the melting point of the rubber. Not enough heat would be generated to melt the steel, just enough to separate the rubber materials from the steel. In this manner, the tires are broken down into combustible fluids that can be moved into an area where they can be burned as fuel while leaving the metal behind for disposal.

In a more complex device for a much larger application, the burner combustion would take place in a sloped rotary kiln, with the combustible products as vapors or gases leaving the upper opening and the metal waste discharging from the lower opening. The metal would be then be recyclable as steel scrap.

In either case the metal scrap would be condensed and much more easily handled then the wire that is currently generated when processing scrap tires. The cost would be much lower also when compared to conventional scrap tire processing with de-wiring and separation of the rubber from the metal. The inherent problems in the use of tires as fuel and the separation of the metal from the rubber are thus solved and the rubber can be burned for additional fuel while also allowing the scrap metal from the tires to be reused in a desired format.

It is contemplated that the inventive concepts herein described may be variously otherwise embodied and it is intended that the appended claims be construed to include alternative embodiments of the invention except insofar as limited by the prior art. For example, various types of furnaces may be used with the present invention, and the scrap tires may be of different types. Furthermore, different types of metals may be melted in the furnace besides the scrap metal, including such metals as iron pellets, direct reduced iron ("DRI"), pig iron and iron carbide, which are often scrap substitutes.

There has therefore been shown and described a process for melting scrap metal which accomplishes the stated objectives.

What is claimed is:

1. A process for melting metal in a vessel comprising:
providing a container adjacent to the vessel, wherein the container is a rotary kiln;
providing a quantity of scrap rubber into the container;
providing at least one burner to heat the quantity of scrap rubber in the container to convert the quantity of scrap rubber into combustible liquids, gasses and solids;
separating metal residue from the liquids, gasses and solids;
providing the converted scrap rubber into the vessel containing metal; and
melting the metal contained in the vessel using in part the converted scrap rubber.

2. The process of claim 1 wherein the container includes a control damper to control or prevent air entry.

3. The process of claim 1 wherein the at least one burner comprises an oxygen gas burner, and wherein the at least one burner is connected to the container so as to heat an outside surface of the container.

4. The process of claim 1 further comprising providing a pipe in fluid communication with the container and the vessel, wherein the combustible liquids and gasses flow through the pipe and into the vessel.

5. The process of claim 1 further comprising providing a fume collecting duct in fluid communication with the vessel, wherein the fume collecting duct draws the combustible gasses into the vessel.

6. The process of claim 1 wherein the rotary kiln contains the scrap rubber, and wherein heating of the rotary kiln converts the quantity of scrap rubber into liquids, gasses and solids and also separates out scrap metal in the quantity of scrap rubber, and wherein the separated scrap rubber components may be removed through discharge openings in the rotary kiln.

7. The process of claim 6 wherein the scrap rubber is heated under controlled oxygen levels to enable decomposition of at least most of the scrap rubber into liquids, gasses and solids.

8. The process of claim 6 wherein the scrap rubber is heated via the wall of the rotary kiln.

9. A process for melting steel scrap for producing steel in a furnace comprising:
providing a scrap tire ignition container positioned adjacent the furnace and in heat and material transfer connection therewith, the scrap tire container including a quantity of scrap rubber, wherein the scrap tire container is a rotary kiln;

providing at least one heat source to heat the scrap rubber in the scrap tire container to convert the quantity of scrap tires into combustible fluids;

providing a quantity of scrap metal in the furnace;

utilizing and transferring heat generated in the scrap tire container to the scrap metal in the furnace to heat the scrap metal in the furnace to reduce the amount of external energy required to be applied to the furnace for melting of the scrap metal and to thereby increase the efficiency of the furnace;

separating metal residue from the combustible fluid; and feeding the combustible fluid into the furnace to aid in melting the scrap steel-metal in the furnace.

10. The process of claim 9 wherein the scrap rubber includes at least some tires that include an amount of metal.

\* \* \* \* \*